United States Patent [19]

Kataoka et al.

[11] Patent Number: 5,307,470
[45] Date of Patent: Apr. 26, 1994

[54] MICROCOMPUTER HAVING EEPROM PROVIDED WITH DETECTOR FOR DETECTING DATA WRITE REQUEST ISSUED BEFORE DATA WRITE OPERATION RESPONSIVE TO PRECEDING DATA WRITE REQUEST IS COMPLETED

[75] Inventors: Toshiyuki Kataoka; Kazutoshi Yoshizawa, both of Tokyo, Japan

[73] Assignee: NEC Corporation, Tokyo, Japan

[21] Appl. No.: 441,739

[22] Filed: Nov. 27, 1989

[30] Foreign Application Priority Data

Nov. 25, 1988 [JP] Japan .................. 63-298518

[51] Int. Cl.[5] .......................... G06F 13/16; G11C 7/00
[52] U.S. Cl. .................... 395/425; 365/195; 365/218
[58] Field of Search ... 364/200 MS File, 900 MS File; 395/400, 425; 365/191, 194, 195, 222, 218

[56] References Cited

U.S. PATENT DOCUMENTS

| 4,212,057 | 7/1980 | Denlin et al. | 395/425 |
| 4,644,494 | 2/1987 | Muller | 364/900 |
| 4,727,363 | 2/1988 | Ishii | 340/724 |
| 4,774,544 | 9/1988 | Tsuchiya et al. | 355/14 |
| 4,956,795 | 9/1990 | Yamaguchi et al. | 364/571.03 |

FOREIGN PATENT DOCUMENTS 8901204 2/1989 PCT Int'l Appl. .

OTHER PUBLICATIONS

Uffenbeck, John *Microcomputers and Microprocessors*, 1985, pp. 194–195.

Primary Examiner—Joseph L. Dixon
Assistant Examiner—Jack A. Lane
Attorney, Agent, or Firm—Sughrue, Mion, Zinn, Macpeak & Seas

[57] ABSTRACT

A microcomputer includes a central processing unit (CPU) and an electrically erasable and programmable nonvolatile memory (EEPROM) fabricated on a single semiconductor chip. When CPU issues a data write request to EEPROM, a data write control circuit is initiated to perform a data write-processing in which data in an address of EEPROM selected by CPU is first erased and thereafter data from CPU is written into that selected address. There is further provided an over-written detection circuit for detecting that CPU issues another data write request to EEPROM while the data write control circuit is performing the data write-processing and for producing an over-write detection signal to CPU.

10 Claims, 5 Drawing Sheets

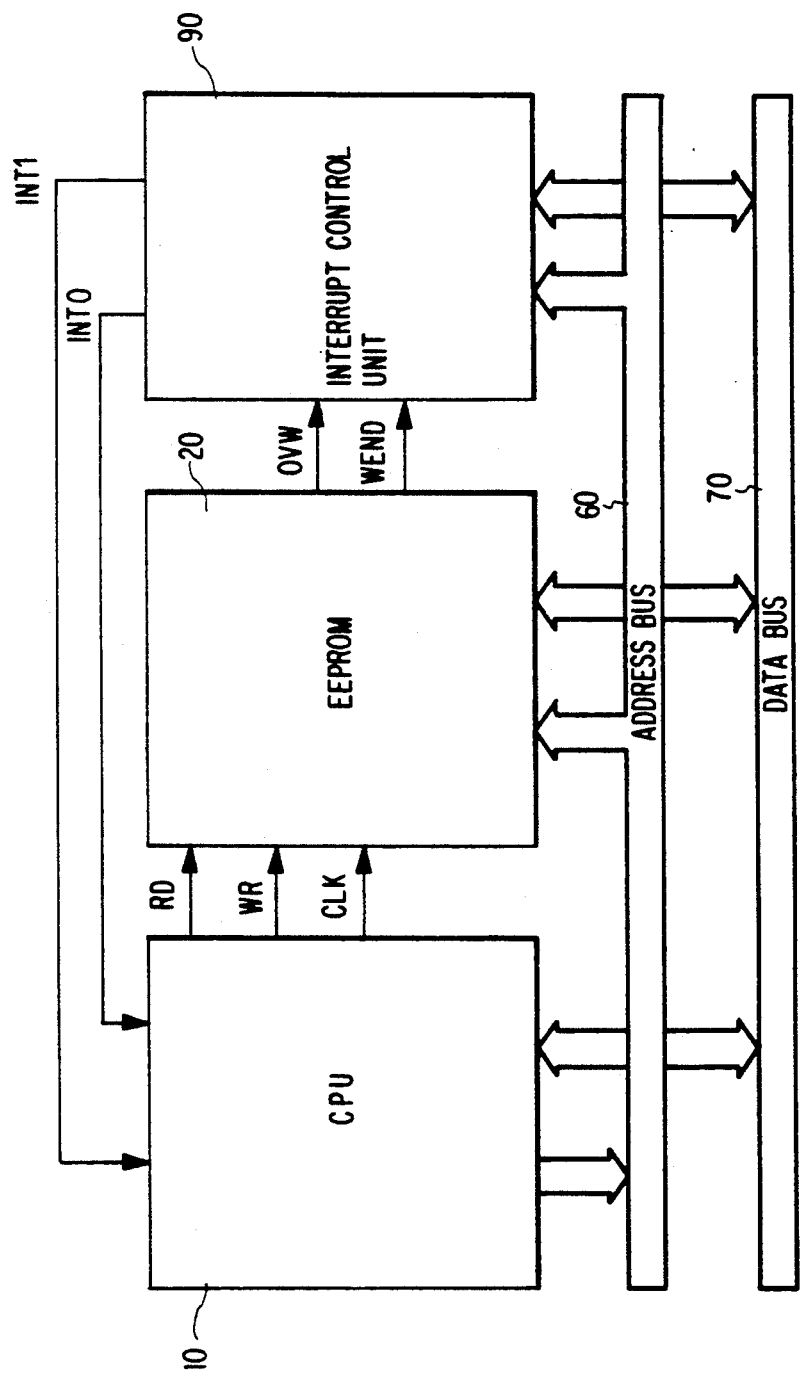

MICROCOMPUTER HAVING EEPROM
PROVIDED WITH DETECTOR FOR DETECTING
DATA WRITE REQUEST ISSUED BEFORE DATA
WRITE OPERATION RESPONSIVE TO
PRECEDING DATA WRITE REQUEST IS
COMPLETED

BACKGROUND OF THE INVENTION

The present invention relates to a microcomputer having a central prossing unit (CPU) and an electrically erasable and programmable nonvolatile memory (caller hereinafter "EEPROM") fabricated on a single semiconductor chip.

In a microcomputer, a static type random access memory (SRAM) is employed in general as a data memory for storing data to be processed and/or processed resultant data. However, SRAM has an unavoidable problem that data stored therein are destroyed when a power voltage applied thereto is cut off. Therefore, it has been proposed to employ, as a part of the data memory, EEPROM into which data can be written and from which data can be read out, and further EEPROM holding data written therein even after a power voltage applied thereto is cut off.

A data write-processing to EEPROM consists of a data erase-operation, which is first performed to erase data already stored in an address into which new data is to be written, and a data write-operation, which is thereafter performed to write the new data into that address. It is well known in the art that such a data write-processing requires a time period of about ten msec. This time period is extremely long as compared with the instruction execution speed of CPU. If CPU manages the data write-processing to EEPROM, therefore, the program execution efficiency is deteriorated remarkably.

An automaton circuit is thus provided to perform and manage the data write-processing to EEPROM in place of CPU. When CPU encounters a data write-instruction to EEPROM, it supplies the write-processing automaton circuit only with a write-command signal, data to be written and address information for selecting a desired address of EEPROM. Thereafter, the operation of CPU is shifted to execute a next instruction. On the other hand, the write-processing automaton circuit is initiated to first erase data stored in the selected address and then write new data into that address. Thus, CPU can execute the program during the data write-processing to EEPROM.

However, since the program execution advances during the data-write processing to EEPROM, there occurs a case that CPU encounters again a data write-instruction to EEPROM before the current data write-processing to EEPROM is completed. Also in that case, CPU generates a data write-request to the automaton circuit and thereafter shifts to execute a next instruction. On the other hand, since the data write-processing responsive to the previous data write-request is still being performed in EEPROM, the new data write-request is disregarded. As a result, data to be written into EEPROM is lost to cause a misoperation.

SUMMARY OF THE INVENTION

Therefore, an object of the present invention is to provide an improved microcomputer having CPU and EEPROM on a single semiconductor chip.

Another object of the present invention is to provide a microcomputer in which data to be written into EEPROM can be prevented from being lost.

A microcomputer according to the present invention is characterized by providing an over-write detection circuit for detecting that CPU generates a new data write-request to EEPROM while the data write-processing responsive to a previous data write-request is being performed and for producing an over-write detection signal to inform CPU that an over-write condition occurs.

The over-write detection signal is used for a polling operation by CPU or an interrupt request to CPU. In the polling operation, CPU can check the production of the over-write detection signal by a program after executing a data write instruction to EEPROM, so that it can be judged whether or not the over-write condition has occurred. The over-write condition is detected to occur, CPU temperarily saves data to be written and address information into a data memory constituted of SRAM, and after the data write-processing responsive to the previous request is completed, CPU generates again the data write-request for the saved data. Accordingly, the loss of data to be written into EEPROM can be prevented. In case where the over-write detection signal is used as an interrupt request to CPU, the data to be written and the address information is saved in an interrupt program routine.

BRIEF DESCRIPTION OF THE DRAWINGS

The above and other objects, advantages and features of the present invention will be more apparent from the following description taken in conjunction with the accompanying drawings, in which

FIG. 5 is a block diagram representative of another embodiment according to the present invention.

DETAILED DESCRIPTION OF THE INVENTION

Figure 1:
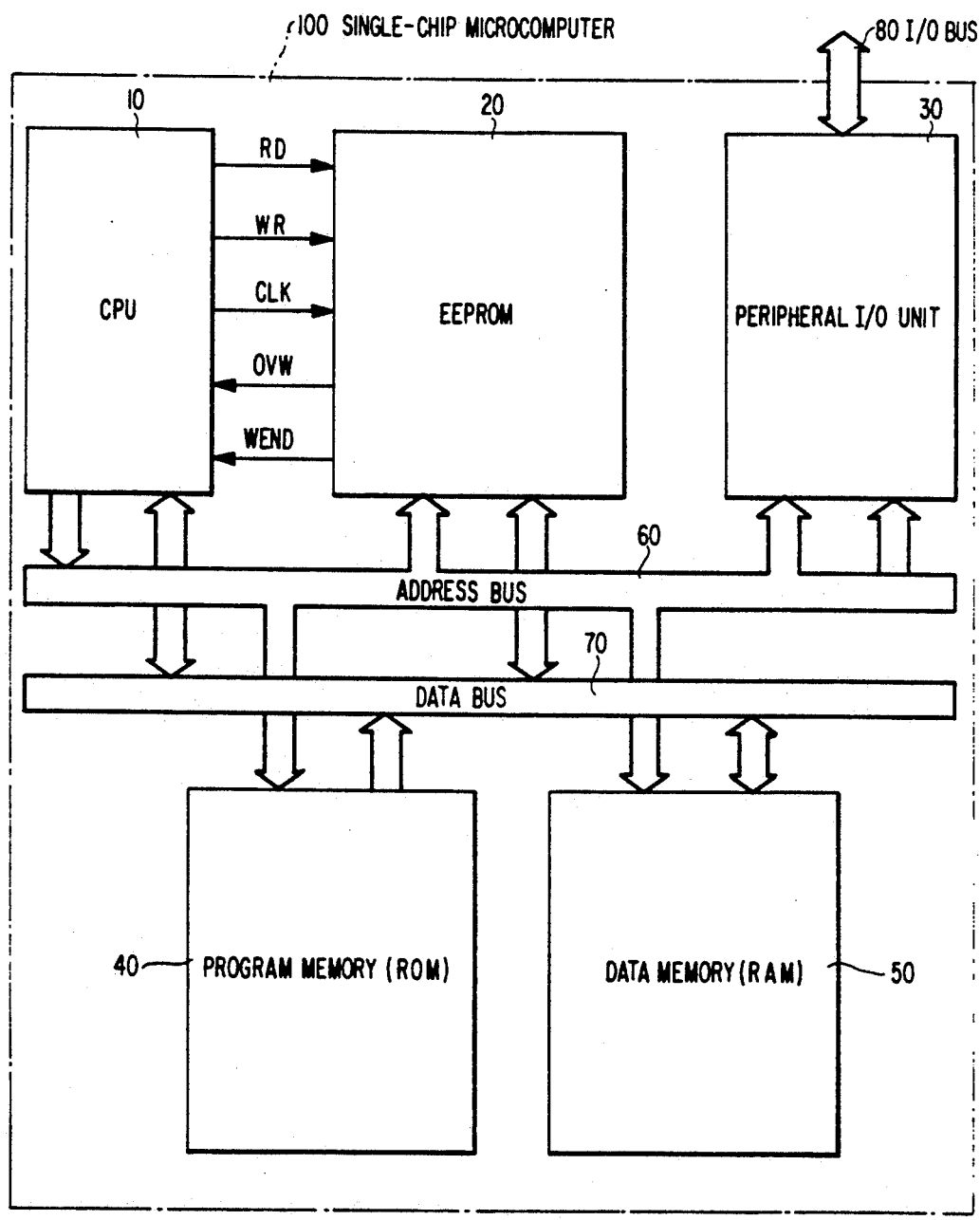
FIG. 1 is a block diagram representative of an embodiment according to the present invention.

Referring to FIG. 1, a microcomputer according to an embodiment of the present invention is represented as a single-chip microcomputer 100 which includes, on a single semiconductor chip, CPU 10, EEPROM 20, a peripheral I/O unit 30, a program memory 40 constituted of a mask ROM and a data memory 50 constituted of SRAM interconnected via an address bus 60 and a data bus 70 to one another. CPU 10 executes a string of instructions for a program stored in ROM 40. By the program execution, CPU 10 reads out data from RAM 50 and performed a desired arithmetic and/or logic operation on the read-out data, the resultant data being then restored in RAM 50. Further, CPU 10 accesses the peripheral I/O unit 30 to supply control data via an I/O bus 80 to devices or equipments to be controlled or to fetch data to be processed therefrom. The unit 30 includes a A/D converter, a serial interface unit, a timer control unit and so forth, as well known in the art. When CPU 10 encounters a data read-instruction from EEPROM 20, it transfers onto the address bus 60 address information for selecting an address of EEPROM 20 and further supplies a read-command signal RD to EEPROM 20. As a result, the data stored in the selected address of EEPROM 20 is read out therefrom onto the data bus 70. CPU 10 can perform an operation on the read-out data, and the resultant data is then stored in RAM 50 or the unit 30.

When CPU 10 encounters a data write instruction to EEPROM 20, it transfers address information for selecting an address of EEPROM 20 and data to be written onto the address and data buses 60 and 70, respectively, and further supplies a write-command signal WR to EEPROM 20. That is, CPU 10 generates a data write request to EEPROM 20. In response thereto, a data writing-processing automaton circuit in EEPROM 20, which will be described in detail later, is initiated to write the data from CPU 10 into the selected address of EEPROM 20. CPU 10 then continues to execute the program. EEPROM 20 is further supplied with a clock signal CLK from CPU 10. The clock signal CLK is used for measuring a data erasing time period and a data writing time period. On the other hand, EEPROM 20 supplies CPU 10 with an over-write signal OVW and a write end signal WEND in accordance with the present invention. The over-write signal OVW assumes an active level when CPU generates a new data write request to EEPROM 20 while the data write-processing responsive to the previous data write request is being performed, and the write end signal WEND assumes an active level when the data-write processing in EEPROM 20 is completed.

Figure 2:
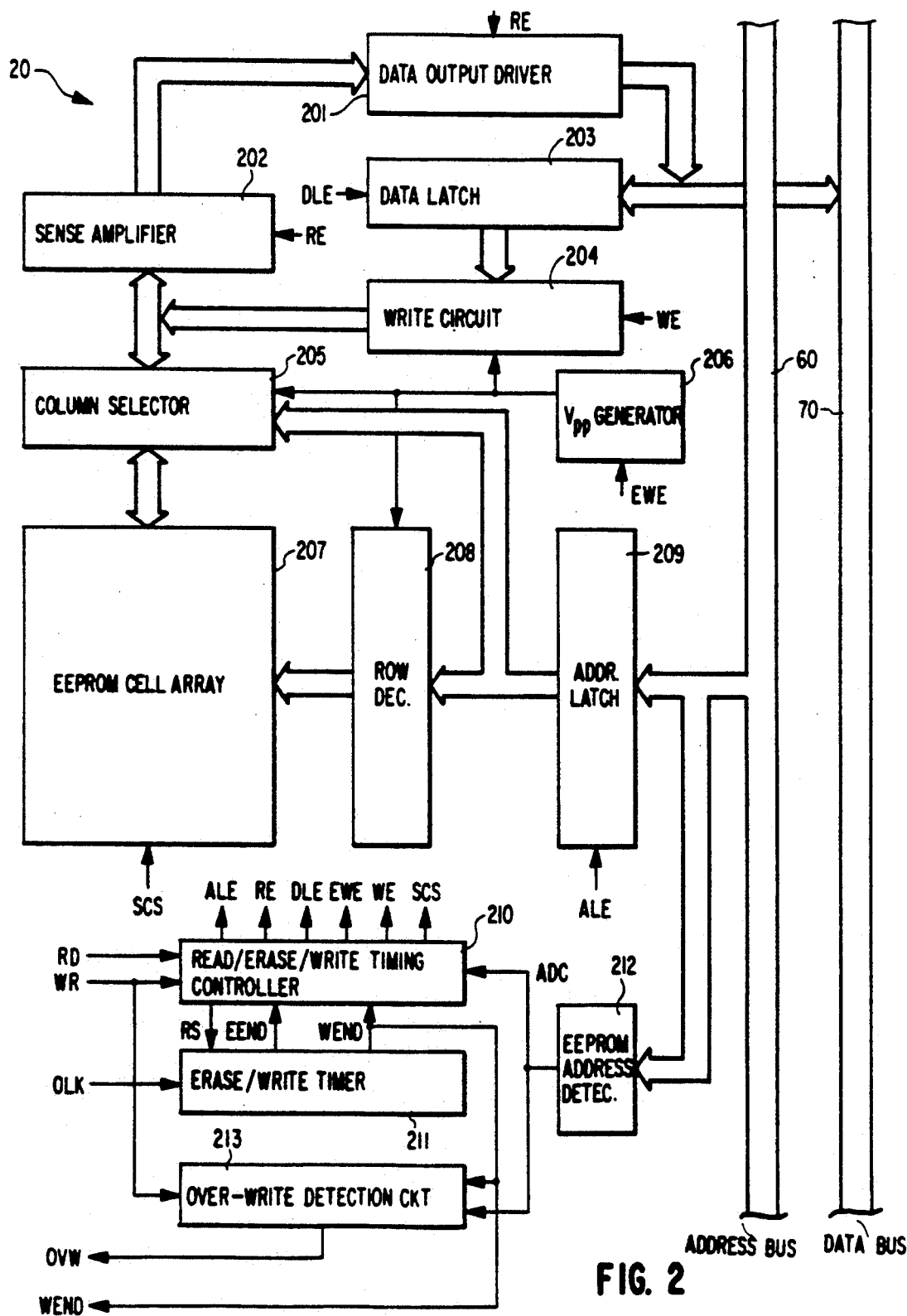
FIG. 2 is a detailed block diagram representative of an EEPROM shown in FIG. 1.

Referring to FIG. 2, EEPROM 20 includes an address detector 212 which receives address information on the address bus 60 to detect whether or not CPU 10 issues an access request to EEPROM 20. In this embodiment, EEPROM 20 is allocated in an address space from "1000H" to "13FFH". The mark "H" denotes a hexadecimal notation. Accordingly, the address detector 212 decodes more significant eight bits of the address information and changes its output ADC to the active level when those bits data are "10H", "11H", "12H" or "13H". When the read-command signal RD is issued from CPU 10 while the output ADC is at the active level, a read/erase/write timing controller 210 initiates a data read operation. In this operation, an address latch-enable signal ALE and a read-enable signal RE are changed to an active level. An address latch circuit 209 latches the address information on the address bus 60 in response to the signal ALE and supplies a part of the latched address information to a row decoder 208 as a row address, the remaining part thereof being supplied to a column selector 205 as a column address. A desired address in an EEPROM cell array 207 is thereby selected, and the data stored in the selected address is then supplied to a sense amplifier 202. The cell array 207 includes a plurality of EEPROM cells (not shown) arranged in row and column to form a matrix. In the present embodiment, each of EEPROM cells is constituted of a field effect transistor having a floating gate, a control gate, a source and a drain. A signal SCS supplied to the cell array 207 is a source potential control signal of each EEPROM cell and takes the high level in the read operation to ground the source of each memory cell. The data from the cell array 207 is amplified by the sense amplified activated by the signal RE and then transferred onto the data bus 70 through a data output driver 201 which is also activated by the signal RE.

On the other hand, when CPU 10 issues the write-command signal WR while the address detection output ADC is at the active level, the timing controller 210 initiates the data write-processing. In this processing, the address latch-enable signal ALE and a data latch-enable signal DLE are changed to an active level, so that the address information on the bus 60 and the data on the bus 70 are latched in the address latch circuit 209 and a data latch circuit 203, respectively. The timing controller 210 further generates a reset signal RS to reset an erase/write timer 211 and an erase/write-enable signal EWE to activate a $V_{pp}$ generator 206. This generator 206 includes a voltage bootstrap circuit to bootstrap a power voltage Vcc (5 V in general) supplied to the microcomputer 100 and generate a high voltage $V_{pp}$ (20 V in this embodiment) required to erase and write data. The high voltage $V_{pp}$ is applied to the row decoder 208 and the column selector 205. Thus, the control gate of all the selected EEPROM cells is applied with the voltage $V_{pp}$. At this time, the signal SCS takes the high level, so that the source of each memory cell is grounded. The data erase operation is thereby performed to erase data stored in the selected memory cells. On the other hand, the timer 211, after being reset by the signal RS, starts to count the clock signal and generates an erase end signal EEND when a predetermined erasing time has elapsed. This signal EEND is supplied to the timing controller 210 to inform the completion of the erase operation. In response thereto, the timing controller 210 initiates the data write operation. That is, the signal SCS is changed to the low level, so that the source of each memory cell is brought into a floating condition. Further, a write-enable signal is changed to an active level. A data-write circuit 204 is thereby activated. This circuit 204 supplies the column selector 205 with $V_{pp}$ voltage or ground voltage in accordance with the binary state of each bit of the data latched in the latch circuit 203. If the bit state is "0", $V_{pp}$ voltage is applied to the drain of the corresponding memory cell. In case where the bit state is "1", ground voltage is applied to the drain of the corresponding memory cell. The control gate of each memory cell is grounded. The data write operated is thereby performed. The timer 211 continues to count the clock signal CLK and generates a write end signal WEND when a predetermined writing time period has elapsed. In response to this signal WEND, the timing controller 210 changes the control signals EWE and EW to the inactive level to complete the data write-processing. The signal WEND is further supplied to CPU 10 to inform the completion of the data write-processing. Thus, an automatic data write-processing responsive to the data write request from the CPU 10 is performed without management of CPU 10.

EEPROM 20 further includes an over-write detection circuit 213 in accordance with the present invention. This circuit 213 detects that CPU 10 issues the data write request to EEPROM 20 while the data write-processing is being performed in EEPROM 20 and generates the over-write detection signal OVW.

Figure 3:
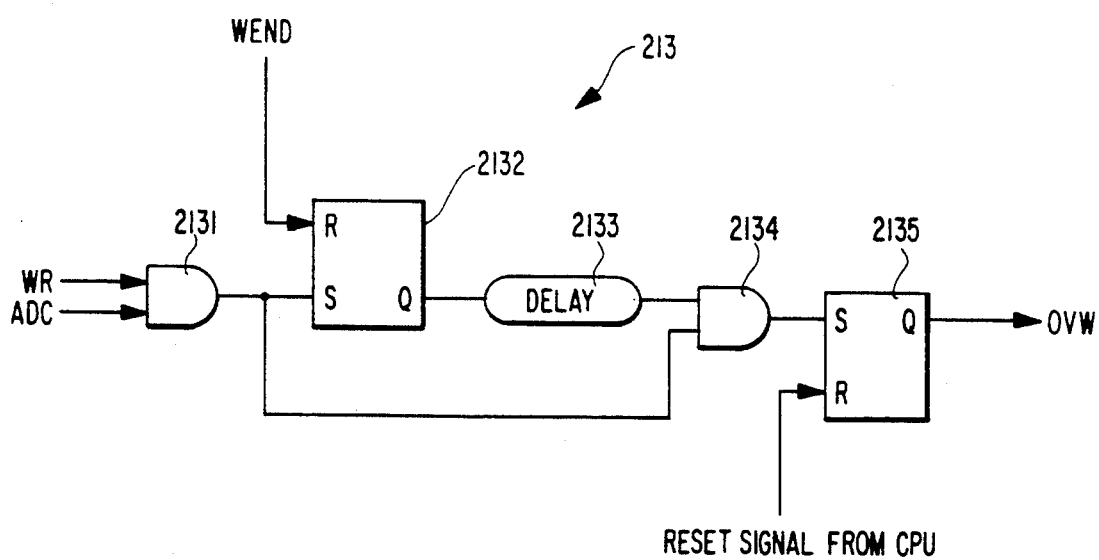
FIG. 3 is a circuit diagram representative of an over-write circuit shown in FIG. 2.

Referring to FIG. 3, the detection circuit 213 includes an AND gate 2131 supplied with the write-command signal WR and the address detection output ADC, an output of which is supplied to a set terminal S of a flip-flop (F/F) 2132. That is, the F/F 2132 is brought into a set state in response to the data write-request from CPU 10. The Q output of F/F 2132 is delayed by a delay circuit 2133 by a time period more than a pulse width of the signal WR. The delayed output is supplied to one input node of an AND gate 2134 having the other input node supplied with the output of the AND gate 2131. The output of the AND gate 2134 is supplied to the set terminal S of F/F 2135, the Q output of which is supplied to CPU 10 as the over-write signal OVW. The F/F 2132 is reset by the write end signal WEND from the timer 211. Accordingly, when CPU 10 issues a new data write request to EEPROM 20 before the write end signal WEND is generated, i.e. before the data write-processing responsive to the previous data write request is completed, the F/F 2135 is brought into the set state to change the over-write signal OVW to the active level (high level). The F/F 2135 is reset by CPU 10 executing a predetermined instruction.

Figure 4:
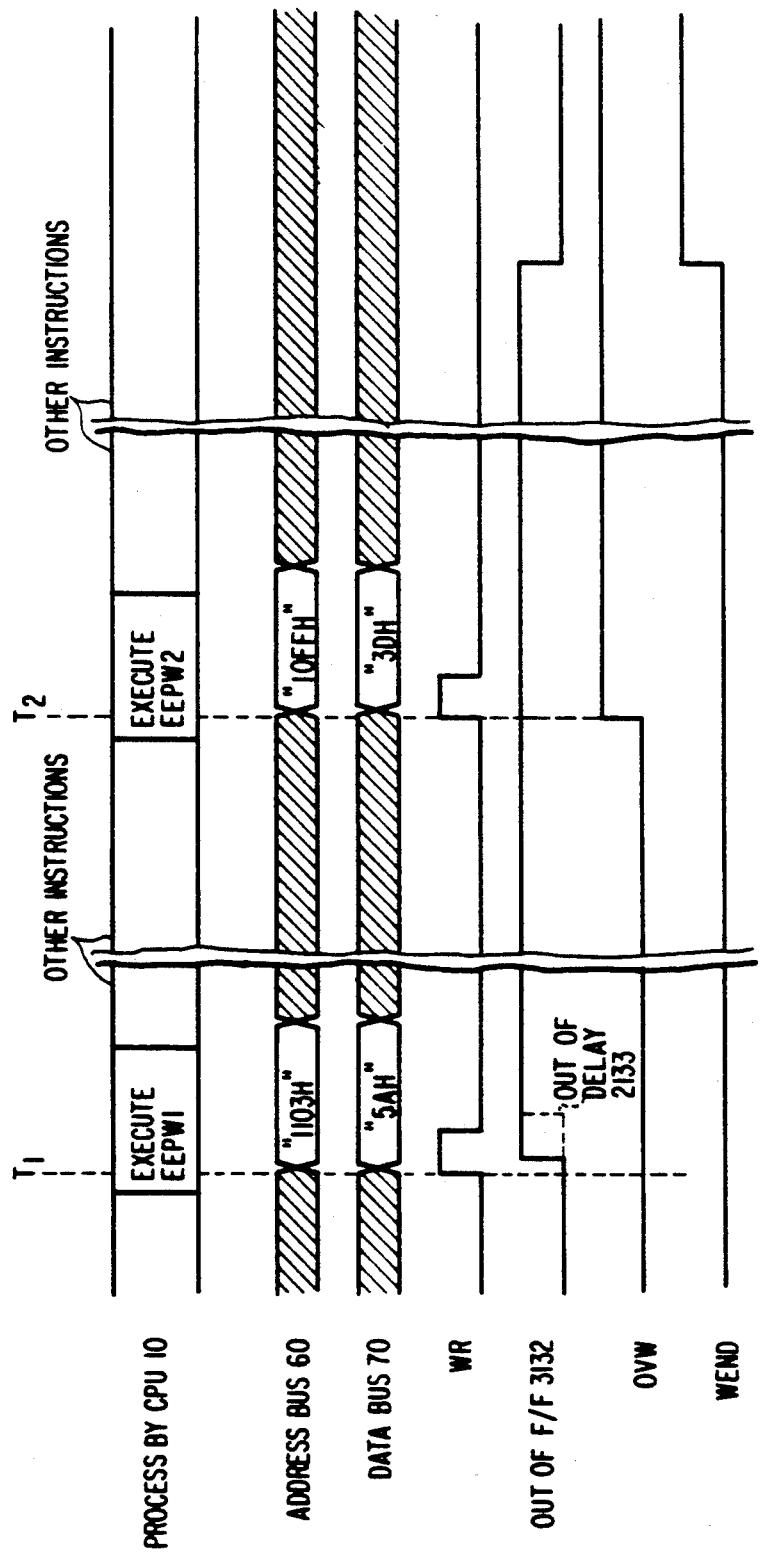
FIG. 4 is a timing chart representative of an over-write detection operation.

Assume that CPU 10 encounters an instruction EPPW1 which instructs to write data of "5AH" stored in a general in CPU 10 into an address "1103H" of EEPROM 20, as shown in FIG. 4. By the execution of this instruction EEPW1, CPU 10 transfers values of "1103H" and "5AH" onto the buses 60 and 70, respectively, and further issues the write-command signal WR at a time point $T_1$ shown in FIG. 4. In response thereto, the address detection signal ADC is changed to the high level to set the F/F 2132. However, the Q output of F/F 2132 is supplied to the AND gate 2134 via the delay circuit 2133 after the signal WR changes to the low level, and therefore the AND gate 2134 holds its output at the low level. The F/F 2135 is not set. CPU 10 thereafter accesses ROM 40 to fetch and execute a next instruction. On the other hand, the data write-processing is initiated in EEPROR 20. That is, the data erasing operation is first carried out with respect to the address "1103H", and by the generation of the erase end signal EEND, the data writing operation is then performed to write the data of 25 "5AH" into that address "1103H". During this data write-processing, CPU encounters an instruction EEPW2 which instructs to write data of "3DH" into an address "10FFH" of EEPROM 20, as shown in FIG. 4. By the execution of this instruction EEPW2, CPU 10 transfers values of "10FFH" and "3DH" respectively onto buses 60 and 70 and issues the write command signal WR at a time point $T_2$ shown in FIG. 4. Since the F/F 2132 is in the set state at this time, the AND gate 2134 outputs the high level to set F/F 2135 at the time point $T_2$. The signal OVW is thereby changed to the high level to inform CPU 10 the occurrence of the over-write condition. In case where the instruction EEPW2 is executed after the generation of the write end signal WEND, the over-write signal OVW is not generated by the reset state of F/F 3132. Once F/F 2135 is set, the set state thereof is not changed even after the data write-processing is completed. F/F 2135 is reset by CPU 10 executing a particular instruction. Therefore, the checking of the level of the over-write signal OVW is not restricted just after the execution of the EEPW2 instruction. By executing the checking instruction of the OVW signal level before a next EEPROM write instruction is supplied CPU 10, it can be detected whether or not the over-write condition has occurred in the execution of EEPW2 instruction. Since the occurrence of the over-write condition is detected by checking the OVW signal, EEPW2 instruction can be again executed after the data write-processing is completed in EEPROM 20 by polling the end signal WEND. Thus, the data of "3DH" can be surely written into the address ";OFFH" of EEPROM 20.

In place of polling the signals OVW and WEND, interrupt program routines can be initiated by those signals. Such a construction is shown in FIG. 5 as another embodiment of the present invention, in which the same contituents as those shown in FIG. 1 are denoted by the same reference numerals to omit further description thereof. In this embodiment, the over-write detection signal OVW and the write end signal WEND are supplied to an interrupt control unit 90 which is located as a part of the peripheral I/O unit. It should be noted that other interrupt request signals supplied to the unit 90 are omitted since they are not related directly to the present invention. The program memory, data memory and other peripheral unit are also omitted.

When CPU 10 executes the EEPW2 instruction shown in FIG. 4, the over-write detection signal OVW is supplied to the interrupt control unit 90 from EEPROM 20. In response thereto, the unit 90 issues an interrupt request signal INT0 to CPU 10. CPU 10 suspends the program execution, saves the contents of a program counter and so forth (not shown), and then read out the vector information from the unit 90. Thus, an interrupt program routine responsive to the over-write signal OVW is initiated. In this routine, the data of "3DH" and the address "10FFH" are temporarily saved in a predetermined area of the data memory 50, and the F/F 2135 is reset. Thereafter, CPU 10 resumes the suspended program execution. This interrupt program routine is initiated each time the over-write signal OVW is generated. When the write end signal WEND is generated, the interrupt control unit 90 issues another interrupt request INT1 to CPU 10. An interrupt program routine responsive to the end signal WEND is thereby initiated. In this routine, the data and address, which has been first saved in the predetermined area of the data memory 50, are read out therefrom, and the data write request for the read-out data and address is issued to EEPROM 20. The suspended program execution is thereafter restarted.

It is apparent that the present invention is not limited to the above embodiments, but may be modified and changed without departing from the scope and spirit of the invention. For example, a program memory and/or a data memory is fabricated outside the semiconductor chip including CPU and EEPROM. Other memory cells such as a so-called MNOS memory cell can be employed as each EEPROM cell. Further, an address-/data multiplex bus can be employed, in which address information and data are transferred thereon in a time-sharing.

What is claimed is:

1. A microcomputer comprising an electrically erasable and programmable nonvolatile memory unit and a central processing unit executing a program and issuing a data write request to said memory unit,
    said memory unit including:
    write control means responsive to said data write request issued by said central processing unit for performing a data write processing operation in which data in a predetermined address of said memory unit is erased and thereafter new data is written into said predetermined address of said memory unit; and
    detection means for detecting issuance by aid central processing unit of another data write request to said memory unit while said write control means is performing said data write processing operation, and supplying said central processing unit with a detection signal representing that said central processing unit has issued said other data write request before said data writing processing operation is complete, said central processing unit being allowed to proceed to execute an instruction after issuing said data write request.

2. The microcomputer as claimed in claim 1, wherein said detection means includes a flag, means responsive to said data write request for bringing said flag into a set state, means for bringing said flag into a reset state when said write control means completes said data write processing operation, and means responsive to said other data write request and the set state of said flag for generating said detection signal.

3. The microcomputer as claimed in claim 1, wherein said central processing unit includes an interrupt control unit receiving said detection signal, said interrupt control unit issuing an interrupt request to said central processing unit in response to said detection signal.

4. The microcomputer as claimed in claim 2, wherein said means for bringing said flag into a reset state includes a timer responding to said data write request and producing a data write processing completion signal representative of completion of said data write processing operation after a predetermined time has elapsed, said flag being brought into said reset state by said data write processing completion signal.

5. A microcomputer comprising:
a nonvolatile memory which requires a data write processing operation in order to store data, said data write processing operation including a data erasing operation for erasing data in a predetermined address of said nonvolatile memory and a data writing operation for writing data in said predetermined address;
a central processing unit executing a string of instructions for a program, said central processing unit issuing a data write request to said nonvolatile memory by executing one of said instructions and thereafter continuing to execute said string of instructions;
a first control circuit performing said data write processing operation to store data into said nonvolatile memory in response to said data write request, said first control circuit further generating a first signal during said data write processing operation thereof, said first signal being supplied to said central processing unit to inform said central processing unit that said first control circuit is performing said data write processing operation; and
a second control circuit producing a second signal when said central processing unit issues another data write request to said nonvolatile memory by executing another one of said instructions while said first signal is being generated, said second signal being supplied to said central processing unit to inform said central processing unit that said central processing unit has issued said other data write request while said first control circuit is performing said data write processing operation.

6. The microcomputer as claimed in claim 5, wherein said second control circuit includes a flip-flop circuit which is set by said other data write request and said first signal to produce said second signal and is reset by said central processing unit.

7. A microcomputer comprising:
an electrically erasable and programmable nonvolatile memory which requires data erasing and writing operations in order to store data;
a central processing unit executing a string of instructions for a program, said central processing unit issuing a first data write request to said memory by executing a first one of the instructions and further issuing a second data write request to said memory by executing a second one of the instructions;
a first control circuit performing said data erasing and writing operations to store data into said memory in response to said first data write request, said first control circuit further performing said data erasing and writing operations to store data into said memory in response to said second data write request when said second data write request is issued after said data erasing and writing operations responsive to said first data write request are completed; and
a second control circuit producing a control signal taking a first logic level when said second data write request is issued after said data erasing and writing operations responsive to said first data write request are completed and a second logic level when said second data write request is issued before said data erasing and writing operations responsive to said first data write request are completed.

8. The microcomputer as claimed in claim 7, wherein said central processing unit detects the logic level of said control signal by executing a third one of the instructions after execution of said second one of the instructions and issues again said second data write request when said control signal is detected to be at said second logic level.

9. The microcomputer as claimed in claim 7, further comprising an interrupt control unit and a data storage area, said interrupt control unit issuing an interrupt request to said central processing unit in response to said second logic level of said control signal, and said central processing unit suspending execution of the instructions in response to said interrupt request, performing an interrupt operation to save information relative to said second data write request in said data storage area, and thereafter resuming the execution of the instructions.

10. The microcomputer as claimed in claim 9, wherein said first control circuit generates an operation completion signal when said data erasing and writing operations responsive to said first data write request are completed, said interrupt control unit issuing another interrupt request to said central processing unit in response to said operation completion signal, and said central processing unit suspending the execution of the instructions in response to said other interrupt request, issuing a data write request to said memory by using said information saved in said data storage area, and thereafter resuming the execution of the instructions.

* * * * *

UNITED STATES PATENT AND TRADEMARK OFFICE
CERTIFICATE OF CORRECTION

PATENT NO. : 5,307,470
DATED : April 26, 1994
INVENTOR(S) : Toshiyuki KATAOKA et al.

It is certified that error appears in the above-indentified patent and that said Letters Patent is hereby corrected as shown below:

Col. 1, line 12, delete "caller" and insert --called--.

Col. 2, line 19, delete "temperarily" and insert --temporarily--.

Col. 5, line 68, delete "; OFFH" and insert --10FFH--.

Col. 6, line 64, after "for" insert --(A)--;

Col. 6, line 64, delete "aid" and insert --said--;

Col. 6, line 68, after "and" insert --(B)--.

Signed and Sealed this

Twenty-seventh Day of September, 1994

Attest:

BRUCE LEHMAN

Attesting Officer

Commissioner of Patents and Trademarks